Dec. 10, 1968    M. H. OLSTAD    3,415,313
APPARATUS FOR PRODUCING AIR AT WIDELY DIFFERENT
TEMPERATURES AND RELATIVE HUMIDITIES
Filed June 12, 1967
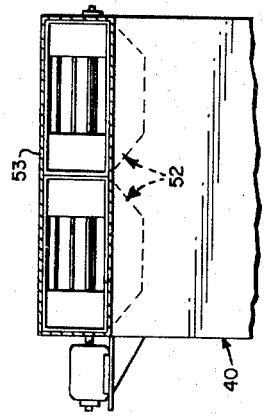
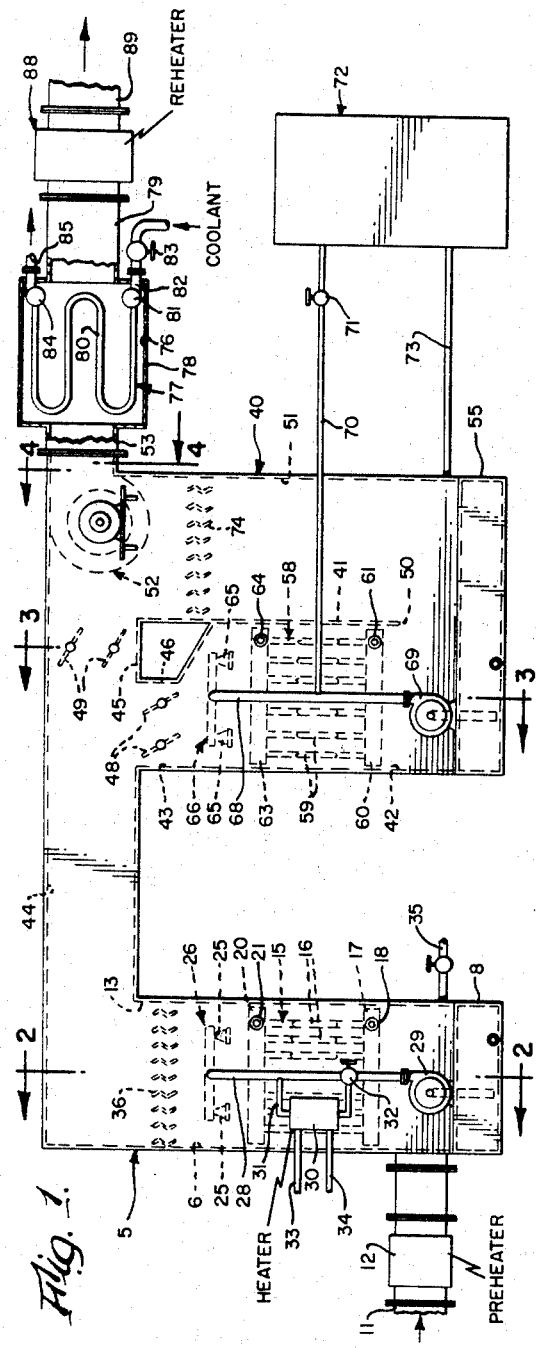
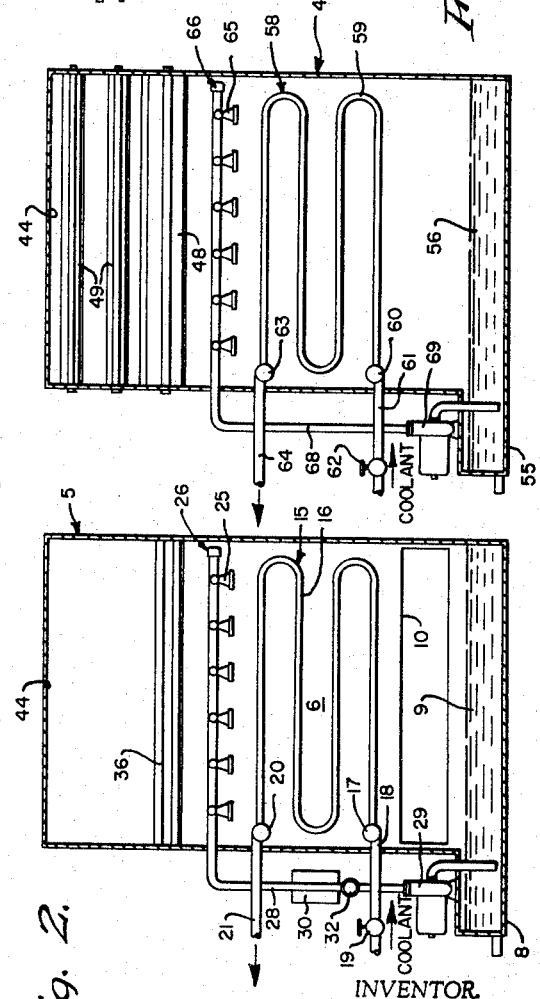
INVENTOR.
MARTIN H. OLSTAD
BY
*Popp and Sommer*
ATTORNEYS United States Patent Office 3,415,313
Patented Dec. 10, 1968

3,415,313
APPARATUS FOR PRODUCING AIR AT WIDELY DIFFERENT TEMPERATURES AND RELATIVE HUMIDITIES
Martin H. Olstad, Port Washington, N.Y., assignor to Niagara Blower Company, New York, N.Y., a corporation of New York
Filed June 12, 1967, Ser. No. 645,255
7 Claims. (Cl. 165—60)

ABSTRACT OF THE DISCLOSURE

The apparatus is a two stage apparatus which can have a third stage if very low output temperatures are desired. When the output air is desired at dewpoints not below 35° F. or near the freezing point of water, only the first stage water sprayed coil is employed which coil can be supplied with a coolant to remove the major part of the moisture from the incoming air and to lower its dry bulb, wet bulb and dewpoint temperatures close to freezing. Where subfreezing and subzero output air is desired, the first stage output is passed through a second stage low temperature cooling coil sprayed with water containing an antifreeze component which is maintained at required strength, the air leaving the second stage sprayed coil being capable of being cooled far below zero and a substantial amount of water from first stage output air being condensed into the spray liquid of the second stage. Further, an absorbent liquid can be used in this second stage to reduce the dewpoint of the air without resorting to lowering the temperature of the second stage coil merely to obtain such lowered dewpoint. To obtain still lower output air temperatures, say −100° F., the output from the second stage sprayed coil can be passed over a dry third stage cooling coil, the frost formation on the latter being insignificant. Air preheaters and reheaters can be employed as well as a heater for the water of the first stage where the desired output air conditions require them.

In the accompanying drawing FIG. 1 is a fragmentary side elevational view of apparatus embodying the subject invention. FIGS. 2, 3 and 4 are vertical sections taken on the correspondingly numbered lines of FIG. 1.

The apparatus is shown as comprising a first stage rectangular casing 5 forming a first stage chamber 6, the bottom of this casing being closed to form a tank 8 which contains a body of water 9. Air is admitted to the lower part of this first stage casing 5 through a side inlet 10 supplied from an inlet duct 11 which can contain a preheater 12 for preheating the air admitted to the system if required, such as when admitting fresh air during the wintertime. The top of the first casing 5 is open to provide an air outlet 13.

Mounted in the chamber 6 is a first stage cooling coil, indicated generally at 15, and comprising a bank of smooth surfaced serpentine tubes 16, this bank occupying substantially the full cross sectional area of the first stage chamber 6 so that the air entering the inlet 10 and moving up through the first stage chamber 6 out through the outlet 13 is brought into heat exchange relation with these tubes of this first stage cooling coil. The lower ends of the serpentine tubes 16 are connected to a common inlet header 17 having a coolant inlet 18 extending through the adjacent wall of the first stage casing 5 and supplied with coolant through an inlet line having a valve 19. The upper ends of the serpentine tubes 16 connect with and discharge into a common outlet header 20 having an outlet 21 extending through the corresponding side wall of the first stage casing 5.

Any suitable coolant can be employed, but it is an important feature of the invention that the coolant supplied through the inlet valve 19 be not lower than about the freezing point of water for a purpose which will presently appear.

High heat transfer efficiency of the first stage coil 15, as well as humidification when required, is obtained by spraying the water 9 from the sump 8 through a multiplicity of jets or nozzles 25 directly onto the serpentine tubes 16, the water from these jets or nozzles forming a thin film around each tube through which heat transfer is effected from the coolant within these tubes to the air flowing up through the first stage chamber 6. For this purpose the downwardly directed nozzles 25 form part of a spray tree 26 arranged in the first stage chamber 6 above the first stage cooling coil 15, the inlet end of this spray tree extending through the corresponding wall of the first stage casing 5 and being connected to a vertical recirculation pipe 28. The water 9 is supplied to this spray tree 26 and nozzles 25 by a pump 29 which withdraws the water 9 from the sump or tank 8 and discharges it into the lower end of the vertical pipe 28.

In addition a water heater 30 can be provided in a bypass line 31 for the vertical pipe 28, the proportion, if any, of the water 9 bypassed through this heater 30 being under control of a three-way valve 32 at one end of the bypass line 31. Heating medium can be supplied to the heater 30 through inlet and outlet lines 33 and 34.

Makeup water can be supplied to the sump 8 by means of a valved water supply line 35 and the air on leaving the sprays from the nozzles 25 is passed through eliminator plates 36 which serve to remove any entrained moisture from the air.

The apparatus also comprises a second stage rectangular casing 40 divided by a vertical central partition 41 to provide a second stage spray chamber 42 into which air is admitted from a top inlet 43 connecting with a horizontal top duct 44 into one end of which the air from the first stage casing 5 discharges through its outlet 13. The inlet 43 is in the form of a vertical duct provided by a horizontal shelf 45 projecting into it from the top of the partition 41 and a vertical wall 46 extending downwardly from the end of the shelf 45 opposite from the partition 41. This inlet duct 43 for the second stage spray chamber 42 contains a suitable number of close-off dampers 48 which serve to close off this inlet duct 43. These dampers act in conjunction with close-off dampers 49 in the horizontal top duct 44 above the shelf 45 and which serve to close off this horizontal duct 44 at this point.

The vertical partition 41 stops short of the bottom of the casing 40 so as to provide an outlet opening 50 from the second stage chamber 42 leading to a vertical passageway 51 the upper end of which opens into the horizontal top duct 44 on the downstream side of the dampers 49. Air is withdrawn from this end of the horizontal top duct 44, and hence from the upper end of the passageway 51 by means of fans 52 which discharge into a duct 53.

The bottom of the second stage casing 40 is formed to provide a tank 55 which contains a body of water 56 containing an antifreeze component. Mounted in the second stage chamber 42 is a second stage cooling coil, indicated generally at 58, and comprising a bank of smooth surfaces serpentine tubes 59. This bank occupies substantially the full cross sectional area of the second stage chamber 42 so that the air entering the inlet 43 and moving down through the second stage chamber 42 and out through the outlet 50 is brought into heat exchange relation with these tubes of this second stage cooling coil 58. The lower ends of the serpentine tubes 59 connect to a common inlet header 60 having a coolant inlet 61 extending through the adjacent wall of the second stage casing 40 and supplied with coolant through an inlet line having a valve 62. The upper ends of the serpentine tubes 59 connect and discharge into a common outlet header 63 having an outlet 64 extending through the corresponding side wall of the second stage casing 40.

Any suitable coolant can be employed, but it is an important feature of the invention that the coolant supplied through the inlet valve 62 be at a temperature substantially below the freezing point of water for a purpose which will presently appear.

High heat transfer efficiency of the second stage coil 58, as well as prevention of the formation of ice on this coil from moisture derived from the passing air, is obtained by spraying the water 56 containing an antifreeze component from the sump 55 through a multiplicity of jets or nozzles 65 directly onto the serpentine tubes 59. The water with its antifreeze component from these jets or nozzles form a thin film around each tube through which heat transfer is effected from the coolant within these tubes to the air flowing downstream through the second stage chamber 42, and these constantly replenished films of water absorb moisture from the passing air to prevent the formation of ice on these tubes. For this purpose the downwardly directed nozzles 65 form part of a spray tree 66 arranged in the second stage chamber 42 above the second stage cooling coil 58, the inlet end of this spray tree extending through the corresponding wall of the second stage casing 40 and being connected to a vertical recirculation pipe 68. The water 56 with its antifreeze medium is supplied to this spray tree 66 and nozzles 65 by a pump 69 which withdraws the water and its antifreeze component 56 from the sump or tank 55 and discharges it into the lower end of the vertical pipe 68.

A feature of the invention also resides in the use of an absorbent liquid as the liquid 56 in this second stage not merely to prevent icing up of the second stage cooling coils 58 but also to lower, directly, the dewpoint of the passing air to a desired value, without resorting to added refrigeration and reheating merely to obtain such lowered dewpoint.

When this spray water, together with its antifreeze and/or absorptive component, being discharged from the nozzles 65 functions to remove moisture from the passing air, either to prevent icing up of the serpentine tubes 59 or to reduce, directly, the dewpoint of the air to a desired value, it becomes progressively more and more dilute with respect to its antifreeze or moisture absorptive component. Accordingly to maintain this body of water 56 at proper strength with respect to its antifreeze or moisture absorptive component, a branch pipe 70 of the pump discharge line 68, which contains a valve 71, leads to a concentrator 72, such as the concentrator disclosed in the Stutz Patent 2,825,680, dated Mar. 4, 1958. After concentration by driving off the excess water in this concentrator 72, the concentrate is returned to the sump 55 via return line 73.

Eliminator plates 74 are arranged across the top of the passageway 51 to prevent water entrained in the air passing downwardly through the second stage spray chamber 42 from passing out of the second stage casing 40 into the horizontal top ducts 44.

The discharge duct 53 can discharge the output air, when extremely low temperatures are desired, into a third stage chamber 76 provided by a third stage rectangular casing 78 having an outlet 79. Mounted in the third stage chamber 76 is a third stage cooling coil, indicated generally at 77, and comprising a bank of serpentine tubes 80, this bank occupying substantially the full cross sectional area of the third stage chamber 76 so that the air moving through this third stage chamber 76 and out through the outlet 79 is brought into heat exchange relation with these tubes 80 of this third stage cooling coil 77. The lower ends of the serpentine tubes 80 are connected to a common inlet header 81 having an inlet line 82 extending through the adjacent wall of the third stage casing 78 and supplied with a below zero coolant through the inlet line 82 having a valve 83. The upper ends of the serpentine tubes 80 connect with and discharge into a common outlet header 84 having an outlet 85 extending through the corresponding side wall of the third stage casing 78.

Any suitable coolant can be employed, but it is an important feature of the invention that the coolant supplied through the inlet valve 83 be at a very much lower temperature than the below freezing coolant supplied through the valve 62 to the second stage cooling coil 58 for a purpose which will presently appear.

The air from the outlet 79 from the third stage chamber 76 can be passed through a reheater 88 and thence through its outlet 89 to the room or space to be served. Such a reheater would be used with very low leaving temperatures such as when cooling the air in the third stage chamber 76 to, say, $-100°$ F. to get a desirable dewpoint, and then reheat the air to get a higher dry bulb.

OPERATION

The air to be processed, which can be fresh or recirculated air or a mixture of both, is drawn in the inlet duct 11 by the fans 52. In the event the dampers 48 are open and the dampers 49 are closed, this air from the inlet duct 11 is drawn through the preheater 12, inlet opening 10, up through the first stage chamber 6, outlet 13 into one end of the top horizontal duct 44, down inlet 43 into and down through the second stage chamber 42, outlet 50 and up through passageway 51 into the other end of the top horizontal duct 44, outlet duct 53 and through third stage chamber 76, reheater 88 and its outlet duct 89 to the room or space to be served. In the event dampers 49 are open and the dampers 48 are closed, the air from the outlet 13 of the first stage chamber 6 into the one end of the top horizontal duct 44 flows directly to the other end thereof, by-passing the second stage chamber 42 completely, and discharging through the third stage chamber 76, reheater 88 and outlet duct 89 to the room or space to be served.

Spray water 9 from the sump 8 in the first stage casing is being recirculated by the pump 29, pipe 28 and overhead spray tree 26 and its nozzles 25 onto the first stage coil 15, this spray water falling back into the sump 8. When required, this spray water is heated by setting three-way valve 32 to by-pass it through the heater 30. When required, coolant is supplied to the first stage coil 15 under control of the valve 19.

When required, water 56 containing an antifreeze medium from the sump 55 in the second stage casing 40 is recirculated by the pump 69, pipe 68 and overhead spray tree 66 and its nozzles 65 on to the second stage cooling coil 58. A low temperature coolant is supplied to this second stage coil 58 under control of a valve 62. When the second stage coil 58 is in use to remove moisture from the air, a part of the discharge from the pump 69 is by-pased via line 70 into the concentrator 72 where the excess water is driven off and its strength in antifreeze component increased before being returned through the line 73 to the sump 55.

Assuming that all fresh air is supplied from the inlet 11 during the wintertime with low outside temperature and that a high temperature, high humidity atmosphere is desired in the room being served, the preheater 12 would be activated so that the incoming cold fresh air could not freeze the water 9 being sprayed against the first stage coils 15. The coolant to these first stage coils 15 would also be cut off by closing the valve 19 and the water heater 30 would be activated, by adjustment of the three-way valve 32, to heat the water 9 being discharged by the spray nozzles 25 to the extent needed to add the required amount of water to the passing air. Under these conditions, the close-off dampers 48 would be closed and the close-off dampers 49 open so that the moist, warmed air from the first stage spray chamber 6 of the first stage casing 5 would pass through the overhead duct 44 directly into the inlets of the discharge fans 52. If the air leaving the fans 52 had too low a dry bulb temperature, this could be adjusted by admitting the required amount of heating medium to the reheater 88.

A more usual example of performance would be in the summertime, using the first stage spray chamber only with the close-off dampers 49 open and the close-off dampers 48 closed, to obtain a lower than outside dry bulb temperature and a dewpoint as low as 35° F. Under these circumstances the supply of heating medium to the heaters 12 and 30 would be cut off, and, assuming the outside dry bulb temperature to be 95° F. and its wet bulb temperature 78° F. and a consequent dewpoint of 71° F., the temperature of the first stage coil 15 would be adjusted, by the admission of coolant under control of the valve 19 to such temperature below this outside air dewpoint as to condense moisture out of the air and lower its dry bulb and wet bulb temperature to that desired in the room being served.

Again assuming an input of all outside air having a dry bulb temperature of 95° F. wet bulb temperature of 78° F. and dewpoint of 71° F., if a lower than 35° F. leaving dewpoint were desired, the first stage sprayed coil 15 would be inadequate, since being sprayed with fresh water, coolant could not be admitted to cool it below the freezing temperature of water since it would ice up. Accordingly, where lower than about 35° F. wet bulb temperatures are required, the close-off dampers 48 are opened and the close-off dampers 49 closed, so that the air leaving the first stage spray chamber 6, which will be assumed to be as low as practicable without icing up the first stage cooling coil 15, will now enter the second stage spray chamber 42 and flow downwardly past the sprayed second stage cooling coil 58 and thence upwardly through the passage 51 into the inlets of the discharge fans 52.

This second stage coil 58 is sprayed with water containing an antifreeze component the strength of which is maintained by the concentrator 72 and hence the coolant admitted to this second stage coil under control of the valve 62 can lower the coil temperature well below the freezing point of water and to subzero values. Thus, with the assumed output from the first stage spray chamber 6 of 35° F. dry bulb 34.5° F. wet bulb and 34° F. dewpoint, air leaving the bottom of the sprayed secondary coil 58 could have a dry bulb, wet bulb and dewpoint temperature of say, —20° F. This dry bulb temperature could be raised in the reheater 88 if a higher dry bulb temperature is desired. Leaving second stage temperatures lower than —30° F. can be obtained in the second stage spray chamber 42.

With such first and second stage operation, the large amount of water, say 55 pounds per hour, is removed in the first stage spray chamber 6 and a smaller, but substantial, amount, say, 17 pounds per hour, can be removed in the second stage spray chamber 42. With such moisture removal the air leaving the second stage spray chamber 42 can be passed over the dry surface refrigerated coil 77 and its temperature dropped still lower, a dry surface coil 77 being practicable at this point because the frost formed on this coil would be negligible and it could be run practically continuously without requiring any defrosting.

Reheating the air can always be effected by using the reheater.

As an additional feature, the liquid 56 used in the second stage can be selected to be highly absorptive of moisture so as to lower the dewpoint of the air being handled without resorting to a lower temperature, plus reheating, merely to accomplish such reduced dewpoint. This, of course, can effect a striking saving in refrigeration. For example, if a dewpoint of, say, 15° F. is needed at the output of the second stage, this could be accomplished with a highly absorptive liquid 56 at a refrigerant temperature of around 25° F. If such a highly absorptive liquid were not used, in order to obtain this desired 15° F. dewpoint it would be necesary to have a refrigerant temperature (at 61) of from 0° to 5° F. in order to cool the passing air to a 15° F. temperature, saturated, and then reheat it to the required dry bulb temperature. Accordingly by using a highly absorbent liquid 56 where a low dewpoint is required, a saving in both refrigeration and in reheating can be effected.

While the various valves have been shown as hand valves, it will be understood that these, as well as the operation of the dampers, could be made responsive to the air conditions in the room being served, such automatic control forming no part of the present invention and hence not being illustrated.

I claim:

1. Apparatus for producing air at widely different temperatures and relative humidities, wherein the invention comprises means forming a first stage chamber having an air inlet at one end and an air outlet at its opposite end, a first stage cooling coil in said first stage chamber, means adapted to supply a coolant to said first stage cooling coil at a temperature not lower than about the freezing point of water, means for discharging and distributing water over said first stage cooling coil to wet the exterior thereof to provide a heat transfer medium between said first stage coil and the air in said first stage chamber and to humidify said air when required, means forming a second stage chamber having an air inlet at one end and an air outlet at its opposite end, a second stage cooling coil in said second stage chamber, means adapted to supply coolant to said second stage cooling coil at a temperature substantially below the freezing point of water, means for discharging and distributing water containing an antifreeze component over said second stage cooling coil to prevent the formation of ice thereon from moisture condensed from the air in said second stage chamber, discharge fan means having its outlet adapted to be connected to the space to be served and having its inlet connected by one passageway to the outlet of said second stage chamber, a duct connecting the outlet of said first stage chamber both with said inlet to said second stage chamber and to said inlet to said fan means, first close-off dampers across said duct, between said inlet to said second stage chamber and said inlet to said fan means, and second close-off dampers across said inlet to said second stage chamber, whereby upon opening said first close-off dampers and closing said second close-off dampers air is drawn by said fan means substantially exclusively through said first stage chamber to discharge air having a dewpoint temperature above the freezing point of water and upon closing said first close-off dampers and opening said second close-off dampers air is drawn by said fan means first through said first stage chamber and then through said second stage chamber to discharge air having a dewpoint temperature substantially below the freezing point of water.

2. Apparatus as set forth in claim 1 additionally including means forming a third stage chamber, a third stage cooling coil in said third stage chamber, means conducting the discharge from said fan means through said third stage chamber, and means adapted to supply a subzero coolant to said third stage coil.

3. Apparatus as set forth in claim 2 additionally including a reheater for the air from said third stage chamber.

4. Apparatus as set forth in claim 1 additionally including a reheater for the air passing from the outlet from said fan means.

5. Apparatus as set forth in claim 1 additionally including means for heating the water discharged and distributed over said first stage coil.

6. Apparatus as set forth in claim 1 additionally including means for reconcentrating the water discharged and distributed over said second stage cooling coil with respect to its antifreeze component.

7. Apparatus as set forth in claim 1 wherein said antifreeze component is highly moisture absorptive and present in such concentration as to reduce the dewpoint of the air passing through said second stage chamber.

References Cited

UNITED STATES PATENTS

| 2,079,562 | 5/1937 | Olson | 165—60 |
| 2,211,033 | 8/1940 | Shipman | 165—60 |
| 2,243,281 | 5/1941 | Magney | 165—60 |
| 3,277,954 | 10/1966 | Meckler | 165—20 |

WILLIAM J. WYE, *Primary Examiner.*

U.S. Cl. X.R.

165—19, 65; 62—90, 93